Dec. 7, 1937. M. G. WAKSMUNDZKA Re. 20,577

GIRDLE

Original Filed Dec. 28, 1934

Inventor,

M. G. Waksmundzka,

By Simon H. Broder

Attorney.

Reissued Dec. 7, 1937

Re. 20,577

UNITED STATES PATENT OFFICE 20,577

GIRDLE

Maria G. Waksmundzka, Washington, D. C.

Original No. 2,022,751, dated December 3, 1935, Serial No. 759,564, December 28, 1934. Application for reissue May 29, 1936, Serial No. 82,654

9 Claims. (Cl. 2—41)

My invention relates to girdles, corsets, athletic supporters, and other corrective apparel of a similar nature.

Many women wear girdles or corsets to "reduce" the figure. Of course, the person's body does not attain in reality the apparent contours simulated by the garment, even after years of wear. What the girdle or corset does is to compress tissues that are yieldable, like fat, flesh, and, to a lesser extent, muscle. In particular, women tend, by too much eating and too little exercise, to accumulate layers of fat in the regions of the buttocks, hips, and stomach. The usual girdle compresses these layers as long as it is worn. This action is injurious in that it impedes circulation, respiration, digestion, and movement. In addition, it shifts areas of tissue from normal position. Above all, it tends to atrophy the muscular tissues through desuetude and misuse.

It is a commonplace that women will go through torture to follow fashion. And most of them will admit, to themselves if not to others, that corsets and girdles constitute a form of torture. But this self-imposed castigation is the more odious when it is realized that the end-all and be-all thereof, to wit, perfect "molding" of the figure, is not achieved, because of the fact that the girdle shifts its position when the wearer bends, twists, or merely sits. Usually, the device "creeps" upwardly, applying pressure at unwanted and tender areas, tearing stockings if garters are attached, and presenting to the eye of the beholder an uncomfortable and untidy appearance, to the great mental and physical anguish of the victim.

One object of my invention is a girdle which will avoid all these drawbacks. It will be easy and comfortable to wear, will be adjustable, will apply pressure at the proper point and to the proper extent, and will not "ride" or "creep" under any conditions.

Another object of my invention is the provision of a girdle which may be worn by men or women for corrective purposes. It will not only not misuse or atrophy the muscles, but will in fact assist the muscles to attain a healthy tone. It will also tend to correct the posture and otherwise assist nature.

Another object is to provide a girdle that will serve as a rupture belt.

Still another object is to provide an athletic supporter for use in boxing, wrestling, running, and other exercises.

Other objects will appear to those skilled in the art as the specification proceeds.

The invention will be more clearly understood by reference to the accompanying drawing, forming part of the specification.

All reference characters designate the same or similar elements in all figures of the drawing.

Figure 1:
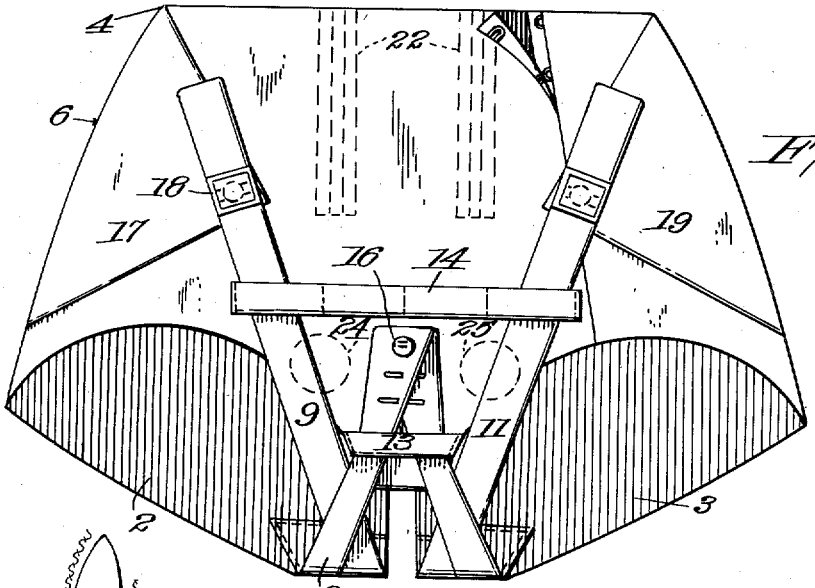
Fig. 1 represents a front view of my invention as applied to a girdle, showing all members thereof secured in position.
Figure 5:
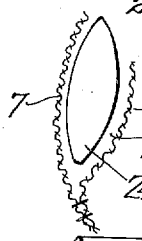
Fig. 5 shows one of the pockets.
Figure 2:
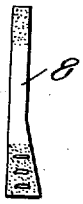
Fig. 2 represents the same article as Fig. 1, showing the members in open position.
Figure 3:
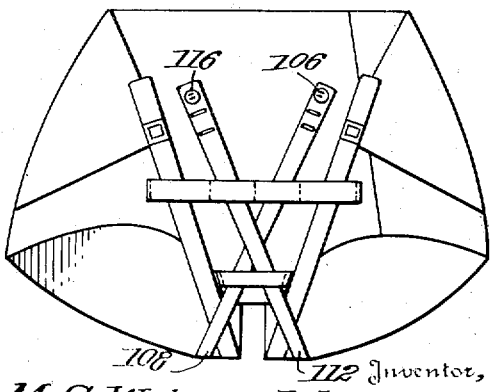
Fig. 3 represents a front view of a modification of my invention.

My girdle, as shown in Figs. 1, 2, and 3, comprises a front portion 1 and a rear portion 2, 3, both shaped to fit the body snugly. The top 4 of the girdle fits at about the waist of the wearer, and the rounded portion 6 fits about the hip. Portions 1 and 2, 3 are spaced from each other and are not joined at the crotch region; they may be split from top to bottom, preferably in the center of the back, and provided with laces, buttons, hookless fastener, snaps, buckles, or any other means for adjustably fitting and securing the girdle to the wearer. Of course, this fastening means may be at one or both sides, or in front, instead or in addition. In any event, the rear portion 2, 3 is left unfastened at its center for some distance upwardly from the lowermost portion, for purposes to be specified hereinafter.

To the bottom of the respective halves 2, 3 of the rear portion of the girdle are sewn or otherwise attached the two pairs of straps 8, 9 and 11, 12. The front portion 1 terminates in what may be termed a crotch member 7, and on this crotch member 7 are two guides 13 and 14. When the device is worn, the straps 8 and 12 pass through the guide 13 and are fastened to a button 16 by means of one of a series of buttonholes in the straps, to permit proper adjustment. It is apparent that snap fasteners, buckles, or other attaching means may be used instead of the button 16 and the buttonholes. The strap 9 is adapted to pass through the guide 14 and to be attached to the flaps 17 by means of the buckle-snaps 18, which permit adjustment, or other similar element. Similarly, the strap 11 passes through the guide 14 and attaches to the flap 19 by means of the buckle-snaps 21.

I have shown the guides 13 and 14 as horizontal, but it is understood that they may be vertical, if desired. Also, the guide 13 may be long enough to permit the straps 9 and 11 to pass therethrough, and the guide 14 may be so positioned as to guide the straps 8 and 12.

If found desirable, the girdle may contain steel or bone stays 22 in the front, sides, or back. At the top may be attached shoulder straps or brassières, and at the bottom may be attached garters.

The crotch member 7 may also contain pockets 24, 25 adapted to hold pads to press against areas of rupture.

In the modified form of my invention shown in Fig. 3, the straps 108 and 112, similar to 8 and 12, extend farther and fasten to the buttons 116 or similar members.

The girdle may be constructed of elastic or non-elastic material, or partially of one and partially of another.

The girdle may be used to hold absorbent pads for use by women, or it may have attached thereto a sac to be worn by men for athletic purposes.

I have discovered that my arrangement of the straps is such as to result in great comfort to the wearer. The fit of the girdle at the waist and the hip will prevent it from sliding down, while at the same time the straps will prevent upward creeping or rising. There is no impeding of circulation anywhere, and indeed the principle may be applied to garments worn continually, for example, to underwear.

When worn by a ruptured person, the straps 8, 9 and 11, 12 are adjusted to give the desired support to the body. In addition, the pockets 24 and 25 may contain pads, as 24'. Of course, these pads are easily removable, so that thicker or thinner pads may be used, as required.

The girdle is first adjusted, by means of the laces, buckles, buttons, or other fastening means, to fit the body snugly. When one leg is moved forward, as in walking, the two straps on that side of the leg will exert a periodic pressure in front and in back of the body, in time with the movement of the leg. I have found that this massaging action tends to reduce and to prevent the accumulation of fatty tissue. Furthermore, this alternate application and release of pressure to the hips, waist, and buttocks actually increases the circulation and results in the formation of muscular tissue of long, silky, fibrous formation, which gives the skin a pleasing appearance.

Since the girdle is snug fitting when the wearer stands in an upright position, any variation in posture, as standing, sitting, or walking improperly, will apply pressure to certain regions of the body and thus remind the person, so that he will tend to acquire a correct posture. This, in turn, will have a beneficial action on the health and mental well-being.

In the form shown in Fig. 3, movement of one leg will create pressure of the opposite sense on the other leg, resulting in further support and massaging of the various muscles. But in both forms of the invention, my idea is fundamentally to not bind or impede circulation or other normal functions of the body in any way. My girdle assists these natural functions and builds up the health of the person so that standing, sitting, or exercise becomes a pleasure and a benefit. In addition, it provides support where needed, and prevents and supports hernia.

Particular attention is called to the fact that in girdles of the usual form the stress that should normally be supported by the muscles is exerted on the girdle, so that the muscles become flabby and atrophied, whereas in my girdle the stress is actually supported by muscles. During movement, the straps transfer the stress from one group of muscles to another, resulting in a rhythmic massage and acceleration of circulation. The pressure exerted by my girdle is longitudinal or along with the muscle, not against it.

If the wearer must go to the toilet, the girdle need not be unfastened in any way, for the straps are positioned to permit free use of the excretory organs. To remove the girdle, the four straps are unsnapped or otherwise unfastened, and the body of the girdle unlaced or unsnapped, which can be done with ease and speed.

For additional comfort, the straps may be shaped to present a round or other surface at the point where they pass the joint of the thighs, and a portion or portions of the strap, for example, the ends, may be of elastic material. Other changes may be made in the form and dimensions to suit the particular wearer, without departing from the spirit of the invention as set forth in the appended claims.

Figure 4:
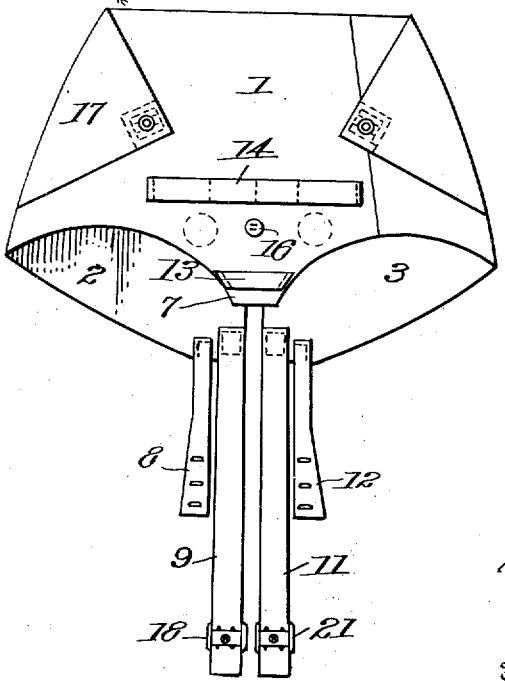
Fig. 4 shows a detail of one form of strap.

Fig. 4 shows the strap 8 or 12 with its ends of elastic material, and the middle portion of non-elastic material. Of course, the straps 9 and 11 may be similarly shaped, or formed.

It is understood, that underwear, outer garments, sanitary belts, supporters, or other articles of apparel may be improved and changed in accordance with my invention to comprise the straps I have described. The straps may be attached to such points of the garment as will result in greatest comfort and benefit, and to this end, two or more of the straps may be crossed, as previously described, near their ends or centers, or nearer one portion of the garment, as may suit the wearer.

Having described my invention, what I claim as new and desire to protect by Letters Patent is:

1. An article of the character described, comprising a body-encircling girdle having a front portion and a rear portion, flaps extending from the sides of said girdle over said front portion, two pairs of straps secured to the respective halves of said rear portion, said straps being adapted to pass between the thighs, a guide on said front portion, said guide guiding at least one of said straps, and means on said flaps and on said front portion for adjustably fastening the free ends of the straps.

2. An article of the character described, comprising a front portion and a rear portion, a strap secured to the right rear portion and adapted to pass between the thighs and to be fastened to the left front portion, a second strap secured to the right rear portion and adapted to pass between the thighs and to be fastened to the right front portion, and two similar straps secured to the left rear portion and adapted to pass between the thighs and to be fastened to the right front portion and left front portion respectively.

3. An article of the character described, comprising a front portion and a rear portion, at least two straps secured to the rear portion at one side thereof and adapted to pass between the thighs and to be fastened to the front portion, the points of fastening being such that the straps cross each other between their ends.

4. An article of the character described, comprising a front portion and a rear portion, a strap extending from the rear portion to the front portion, and a pocket in the front portion adapted to lie against a predetermined area of the anatomy, said pocket being adapted to receive a pad, the strap passing over the pocket and adapted to exert pressure on the pocket and pad.

5. An article of the character described, comprising a front portion and a rear portion, a strap extending from the rear portion to the front portion, and a second strap extending from the rear portion to the front portion, and straps being adapted to pass between the thighs and meeting each other at the front portion at a point above the pubic region.

6. The article set forth in claim 5, including means for guiding and constraining the straps so that they meet at the front portion above the pubic region.

7. The article set forth in claim 5, including a guide loop secured to the front portion for guiding and constraining the straps.

8. An article of the character described, comprising a front portion and a rear portion, a strap extending from the rear portion to the front portion, and a second strap extending from the rear portion to the front portion, the straps being adapted to pass between the thighs, and meeting each other at the front portion only above the pubic region.

9. An article of the character described, comprising a front portion and a rear portion, a strap extending from the front portion to the rear portion, a second strap extending from the front portion to the rear portion, the straps being adapted to pass between the thighs, means for fastening the respective ends of the straps to the front portion and the rear portion, and means for guiding and constraining the straps so that they meet only above the pubic region.

MARIA G. WAKSMUNDZKA.